(12) United States Patent
Rosenbluth et al.

(10) Patent No.: US 7,437,510 B2
(45) Date of Patent: Oct. 14, 2008

(54) INSTRUCTION-ASSISTED CACHE MANAGEMENT FOR EFFICIENT USE OF CACHE AND MEMORY

(75) Inventors: Mark Rosenbluth, Uxbridge, MA (US); Sridhar Lakshmanamurthy, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 348 days.

(21) Appl. No.: 11/241,538

(22) Filed: Sep. 30, 2005

(65) Prior Publication Data

US 2007/0079073 A1 Apr. 5, 2007

(51) Int. Cl.
*G06F 12/00* (2006.01)
(52) U.S. Cl. ........................................ 711/118; 711/133
(58) Field of Classification Search .................. None
See application file for complete search history.

(56) References Cited

U.S. PATENT DOCUMENTS

| | | | | |
|---|---|---|---|---|
| 6,243,791 B1 * | 6/2001 | Vondran, Jr. | | 711/120 |
| 6,584,547 B2 * | 6/2003 | Palanca et al. | | 711/133 |
| 6,640,286 B2 * | 10/2003 | Kawamoto et al. | | 711/133 |
| 2002/0078300 A1 * | 6/2002 | Dharap | | 711/133 |
| 2002/0087796 A1 | 7/2002 | Fanning | | |
| 2002/0188809 A1 | 12/2002 | Kershaw | | |
| 2002/0194291 A1 * | 12/2002 | Najam et al. | | 709/213 |
| 2004/0064651 A1 | 4/2004 | Conway | | |
| 2005/0078696 A1 | 4/2005 | Oner | | |
| 2006/0101208 A1 * | 5/2006 | Kottapalli | | 711/134 |
| 2006/0167975 A1 * | 7/2006 | Chan et al. | | 709/203 |
| 2007/0005901 A1 * | 1/2007 | Kellar | | 711/137 |

FOREIGN PATENT DOCUMENTS

EP  1 387 276 A2  2/2004
EP  1 387 278 A2  2/2004

OTHER PUBLICATIONS

PCT/US2006/037631, PCT International Search Report and Written Opinion, Dec. 21, 2006.

* cited by examiner

*Primary Examiner*—Hiep T Nguyen
(74) *Attorney, Agent, or Firm*—Blakely, Sokoloff, Taylor & Zafman LLP (57) ABSTRACT

Instruction-assisted cache management for efficient use of cache and memory. Hints (e.g., modifiers) are added to read and write memory access instructions to identify the memory access is for temporal data. In view of such hints, alternative cache policy and allocation policies are implemented that minimize cache and memory access. Under one policy, a write cache miss may result in a write of data to a partial cache line without a memory read/write cycle to fill the remainder of the line. Under another policy, a read cache miss may result in a read from memory without allocating or writing the read data to a cache line. A cache line soft-lock mechanism is also disclosed, wherein cache lines may be selectably soft locked to indicate preference for keeping those cache lines over non-locked lines.

22 Claims, 9 Drawing Sheets

```
#pragma CACHE PACKET DATA ON
void f()     // Turn packet data modifier on
{
    ...
}
#pragma CACHE PACKET DATA OFF
void g()     // Turn packet data modifier off
{
    ...
}
```

INSTRUCTION-ASSISTED CACHE MANAGEMENT FOR EFFICIENT USE OF CACHE AND MEMORY

FIELD OF THE INVENTION

The field of invention relates generally to memory caching and, more specifically but not exclusively relates to techniques for management of caches using cache policies identified by instruction hints.

BACKGROUND INFORMATION

One of the most important considerations for handling network traffic is packet throughput (i.e., bandwidth). Network processors and the like are designed to efficiently process very large numbers of packets per second. In order to process a packet, the network processor (and/or switch equipment employing the network processor) needs to extract data from the packet header indicating the destination of the packet, class of service, etc., store the payload data in memory, perform various overhead functions, etc.

In general, the foregoing packet-processing operations require multiple memory accesses. As a result, packet throughput is inherently related to memory (access) latencies. Ideally, all memory accesses would be via the fastest scheme possible. For example, modern on-chip (i.e., on the processor die) static random access memory (SRAM) provides access speeds of 10 nanoseconds or less. However, this type of memory is very expensive (in terms of chip real estate and chip yield), so the amount of on-chip SRAM memory is typically very small. Typical modern network processors employ a small amount of on-chip SRAM for scratch memory and the like.

The next fastest type of memory is off-chip (i.e., external) SRAM. Because this memory is off-chip, it is slower to access (than on-chip memory), since it must be accessed via an interface between the network processor and the SRAM store, with the interface introducing its own latency. Off-chip SRAM is generally used by modern network processors for storing and processing packet metadata, along with storing other temporal processing-related information.

Typically, various types of off-chip dynamic RAM (DRAM) are employed for use as "bulk" memory. Dynamic RAM is slower than static RAM (due to physical differences in the design and operation of DRAM and SRAM cells), and must be refreshed every few clock cycles, taking up additional overhead. As before, since it is off-chip, it also requires a interface (e.g., dedicated or shared bus) to access it. In most of today's network processor designs, DRAM memory stores with enhanced performance are employed, including RDRAM (Rambus DRAM) or DDR DRAM (double data rate), RLDRAM (reduced latency RAM) etc.

In general, DRAM memory accesses produce significant processing latencies relative to many other processing activities, such as mathematical computation. In order to address this problem, various memory-caching schemes may be employed. The basic concept of the caching scheme is to cache recent memory accesses (or other data based on a pre-defined caching policy) in a smaller memory device that has faster access than a larger memory device in which data is usually stored (temporal locality). Also, a cache policy may cache data that is physically close to a needed cache line, since that data will often be needed in the near future (spatial locality).

Another aspect of caching relates to memory coherency. Under a coherent memory architecture, all components in a computing system or apparatus are assured access to the same data values. Memory coherency ensures that data being moved into or out of memory does not appear to have different values when accessed by processors or other components that access shared memory resources. Under the simplest approach, there is only one copy of any particular data at any time in the entire system, and only one component may access that data at one time. While this scheme guarantees memory coherency, it does not permit memory caching. Since memory caching involves making at least one copy of data stored in a shared memory space and then allowing that copy to be modified outside of the shared memory space, there needs to be a mechanism to ensure that only a valid (most recent value) version of a given piece of data may be accessed. This problem is typically solved by using one of several well-known memory and cache coherency schemes that are managed by a processor and/or memory controller, such as by employing a memory write-back scheme.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Embodiments of methods and apparatus that employ instruction-assisted cache management for efficient use of cache and memory are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In accordance with aspects of the embodiments now described, techniques are disclosed for supporting efficient use of cache and memory via instruction-assisted cache management. The techniques reduce memory bandwidth consumption (by eliminating many memory reads and writes typically performed in connection with conventional cache policies), and increase cache effectiveness. Furthermore, the techniques enable programmatic control of cache usage and cache line allocation in a manner that enables programmers to tailor the behavior of caching under various use scenarios.

Figure 1:
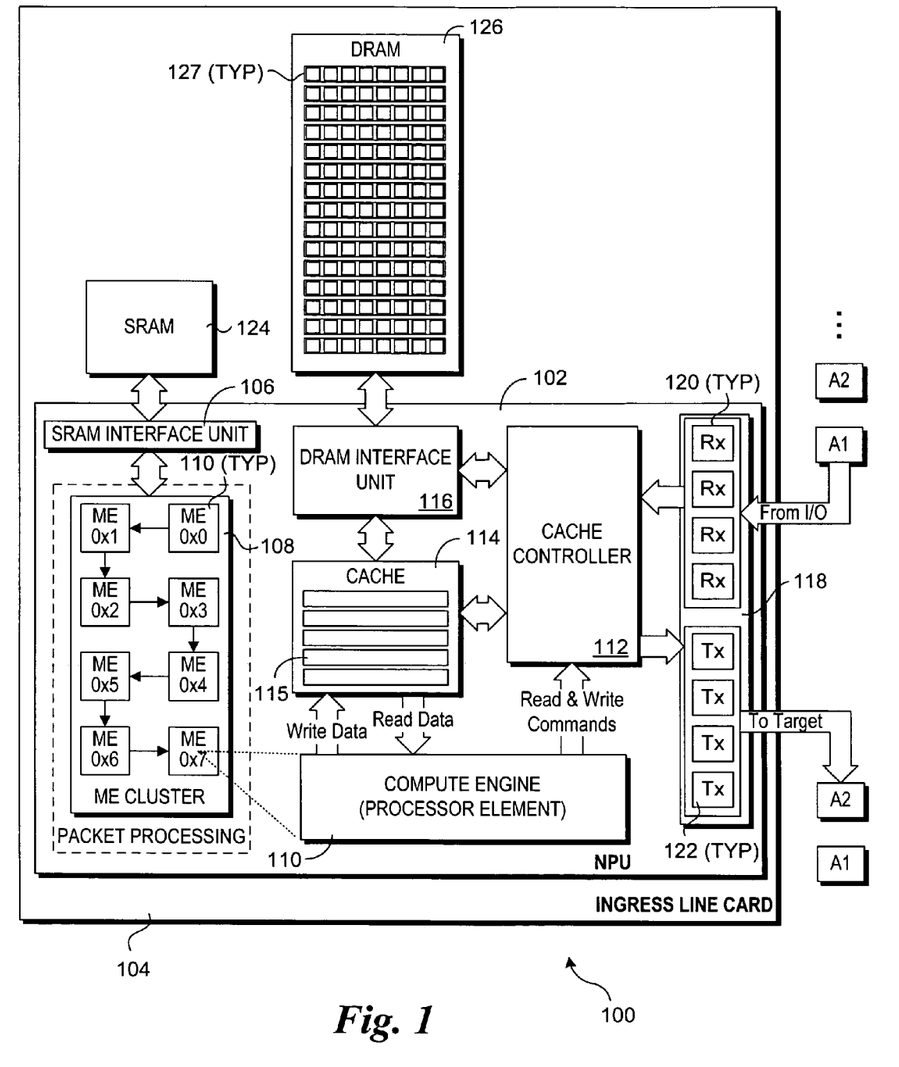
FIG. 1 is a schematic diagram of an exemplary implementation environment via which aspects of the embodiments herein may be practiced.
Figure 8:
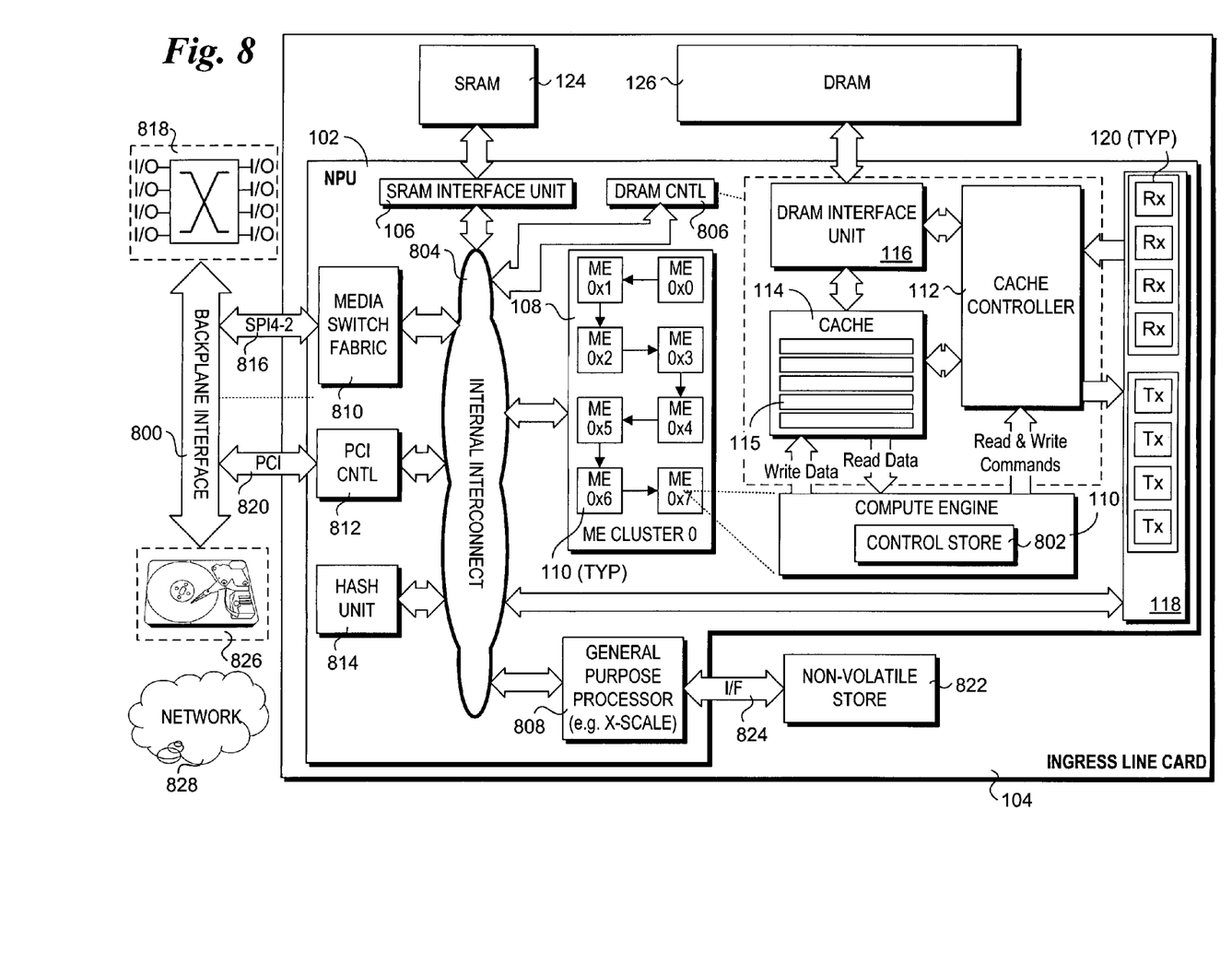
FIG. 8 is a schematic diagram of a network processing unit and line card illustrating further details of the implementation environment of FIG. 1.

By way of example, shows an exemplary implementation environment 100 via which aspects of the instruction-assisted cache management techniques may be practiced. The environment 100 includes a network processor unit (NPU) 102 hosted by an ingress line card 104. For the purpose of clarity, only a selected portion of the NPU's components and functional units are illustrated in FIG. 1; further details of one embodiment of an NPU/line card architecture are shown in FIG. 8 and discussed below. The illustrated components include an SRAM interface unit 106, a processor cluster 108 including a plurality of compute engines (e.g., microengines (ME) under the Intel® IXP NPU architecture) 110, a cache controller 112, a cache 114 including multiple cache lines 115, a DRAM interface unit 116, and a buffer management unit 118 including respective sets of receive (Rx) buffers 120 and transmit (Tx) buffers 122. SRAM interface unit 106 provides access to external (to NPU 102) SRAM 124 hosted by ingress line card 104. Similarly, DRAM interface unit 116 provides access to external DRAM 126, which includes multiple memory blocks 127.

Under many modern network device (e.g., router, switch, etc.) architectures, multiple boards (commonly referred to as line cards) are integrated in a common chassis and communicatively-coupled via a shared backplane or mid-plane. For example, such line cards might be implemented in a standardized modular architecture such as ATCA (Advanced Telecommunications Computing Architecture) or in a blade server environment using standardized blades. Optionally, a proprietary board architecture and chassis may be employed (e.g., Cisco, Nortel, 3Com, etc.) Such modular architectures typically include cards that are designed for particular purposes, such as ingress line cards, egress line cards, framers, and switch fabric (SF) cards. Ingress line card 104 is illustrative of an ingress line card that may be employed under such a modular architecture. However, it is noted that the operations described herein for ingress line card 104 may be implemented using other types of architectures as well, including but not limited to boards providing a combination of functions, such as both ingress and egress functions.

Under a typical use scenario, an ingress line card is employed by a network device or the like to perform initial packet processing on network packets received at the network device. This is depicted in FIG. 1 by packets A1, A2 ..., which are received at an Input/Output (I/O) port of ingress line card 104 and temporarily buffered in Rx buffers 120. Upon completion of such initial packet-processing operations, various packets may be sent to other line cards in the network device via the switch fabric for further processing and/or to be transported to another network device in a network (i.e., outbound transmission). This is illustrated by packets A1 and A2 being transferred from Tx buffers 122 into the switch fabric.

Typical ingress operations include packet (flow) classification, wherein packets are assigned to various flows having common attributes (e.g., destination address, QoS criteria, security measures, etc.) using a predefined packet classification scheme as defined by an Access Control List (ACL) rule set or the like. Many packet classification rule sets employ an N-tuple classification scheme, wherein a highest-priority ACL rule matching N fields (or partial fields in the case of address prefixes) in the packet header is employed as the classification rule. As such, only the packet header data needs to be accessed during such packet classification schemes. In other instances, deep packet inspection (e.g., inspection of packet contents in addition to headers) may be required to perform classification of some packets.

In further detail, a typical conventional ingress packet-processing process proceeds as follows. Upon receiving a packet, the packet is temporarily buffered in an Rx buffer, a buffer in DRAM is allocated, and the packet is copied from the Rx buffer into the DRAM buffer. In conjunction with these operations, a queue descriptor is written into a queue element array in SRAM, wherein the queue descriptor identifies the location of the DRAM buffer associated with the packet. During packet-processing operations such as classification, the packet header data is read from the DRAM buffer and written to on-chip SRAM scratch memory and/or off-chip SRAM (or otherwise accessed via on-chip SRAM). Packet classification may then be performed using the packet N-tuple packet header values in conjunction with one or more lookups in rule tables/database stored in SRAM and/or DRAM and other operations performed by the NPU (such as generating a hash index into a lookup table). Upon completion of the classification, the packet will be assigned to a flow, with a corresponding target flow queue being located on an egress line card. Accordingly, the packet is transferred to the flow queue by reading the packet data from DRAM into a Tx buffer and then transferring the data to the flow queue via the switch fabric.

As discussed above, the lowest memory latency is provided by on-chip SRAM, followed by off-chip SRAM, and then off-chip DRAM, which is significantly slower than off-chip SRAM. Accordingly, each access to DRAM introduces a substantially latency penalty. At the same time, on-chip caching of DRAM buffers for NPU architectures has generally been limited to on-chip SRAM scratch memories, if employed at all. This is due, in part, to the expense (in terms of cost, yield, and chip real-estate) of on-chip memory.

It has been recognized by the inventors that much of the processing performed by an ingress element (e.g., an ingress line card or NPU employed as an ingress processor on a line card including both ingress and egress elements) as related to packet data itself is temporal in nature, and doesn't require repeated memory access and/or repeated modification of the data. Furthermore, although off-chip DRAM is typically employed to store larger amounts of data, much of this data, such as ACL databases and routing tables, is substantially persistent (i.e., non-temporal). Accordingly, it has also been recognized that employing an on-chip cache with a preferential cache policy favoring caching of temporal packet data would be advantageous. Such a scheme is illustrated in FIG. 1.

Figure 2:
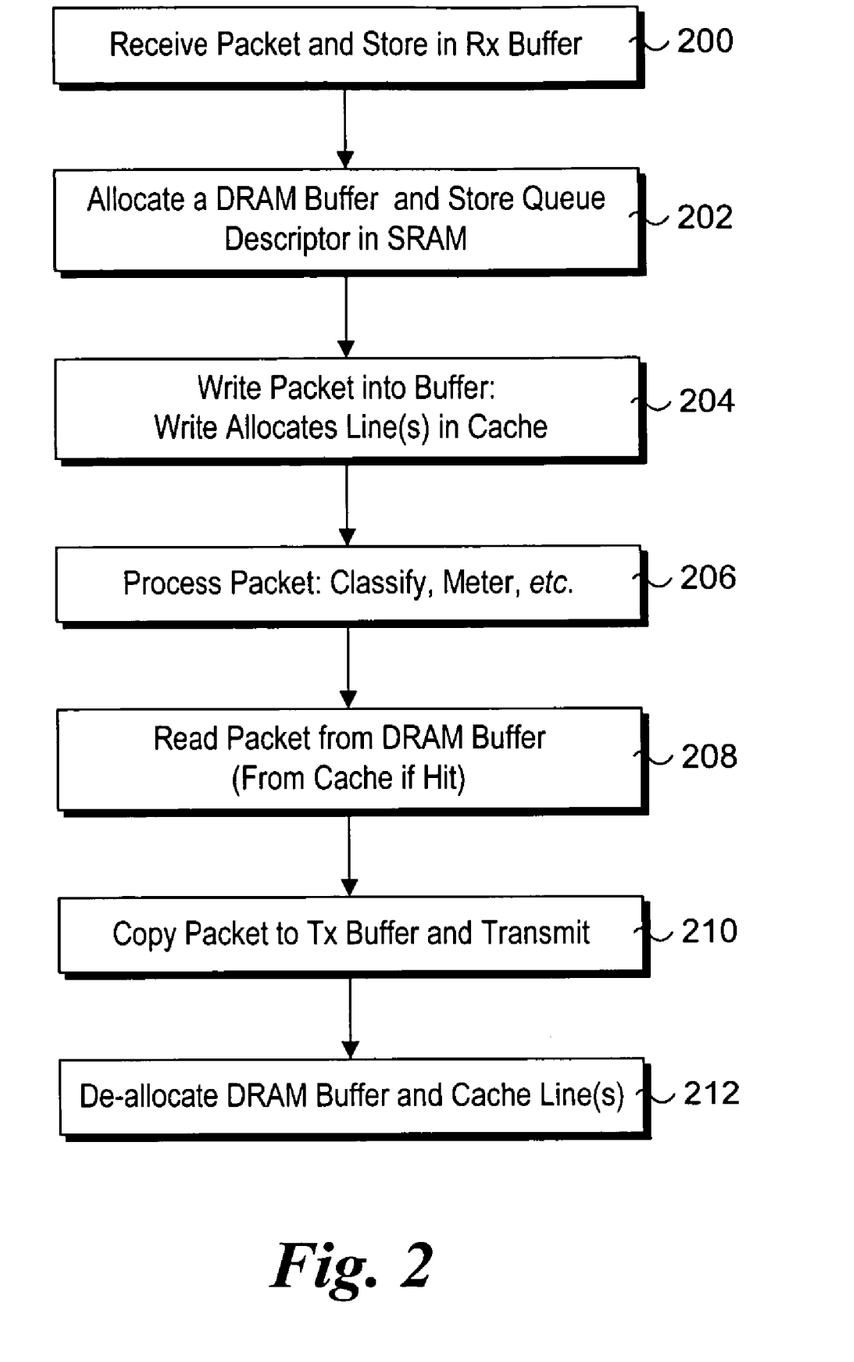
FIG. 2 is a flowchart illustrating operations performed during processing of a packet received at an ingress device.

With reference to the flowchart of FIG. 2, ingress packet processing implementing architecture 100 proceeds in the following. In a block 200, a packet is received via an input port (or otherwise provided to ingress line card 104 via the switch fabric) and temporarily stored in an Rx buffer 120. In a block 202, a DRAM buffer allocated in DRAM 126, and a corresponding queue descriptor is written to SRAM 124. The packet data is then (logically) written to the buffer allocated in block 202 in a block 204. However, rather than write the packet data into DRAM, one or more cache lines 115 (as appropriate) are allocated in cache 114, and data is written to this/these cache lines, as described in further detail below.

Continuing at a block 206, various packet-processing operations, such as classification, metering, etc., are then performed. Upon completion of these operations, the packet data is read from the buffer in a block 208. As discussed below, in the event of a cache hit, the packet data is read from cache 114 rather than DRAM 126. The read data is then copied into a Tx buffer 122, and transmitted into the switch fabric in a block 210. The DRAM buffer and cache line(s) are then de-allocated in a block 212.

Figure 3A:
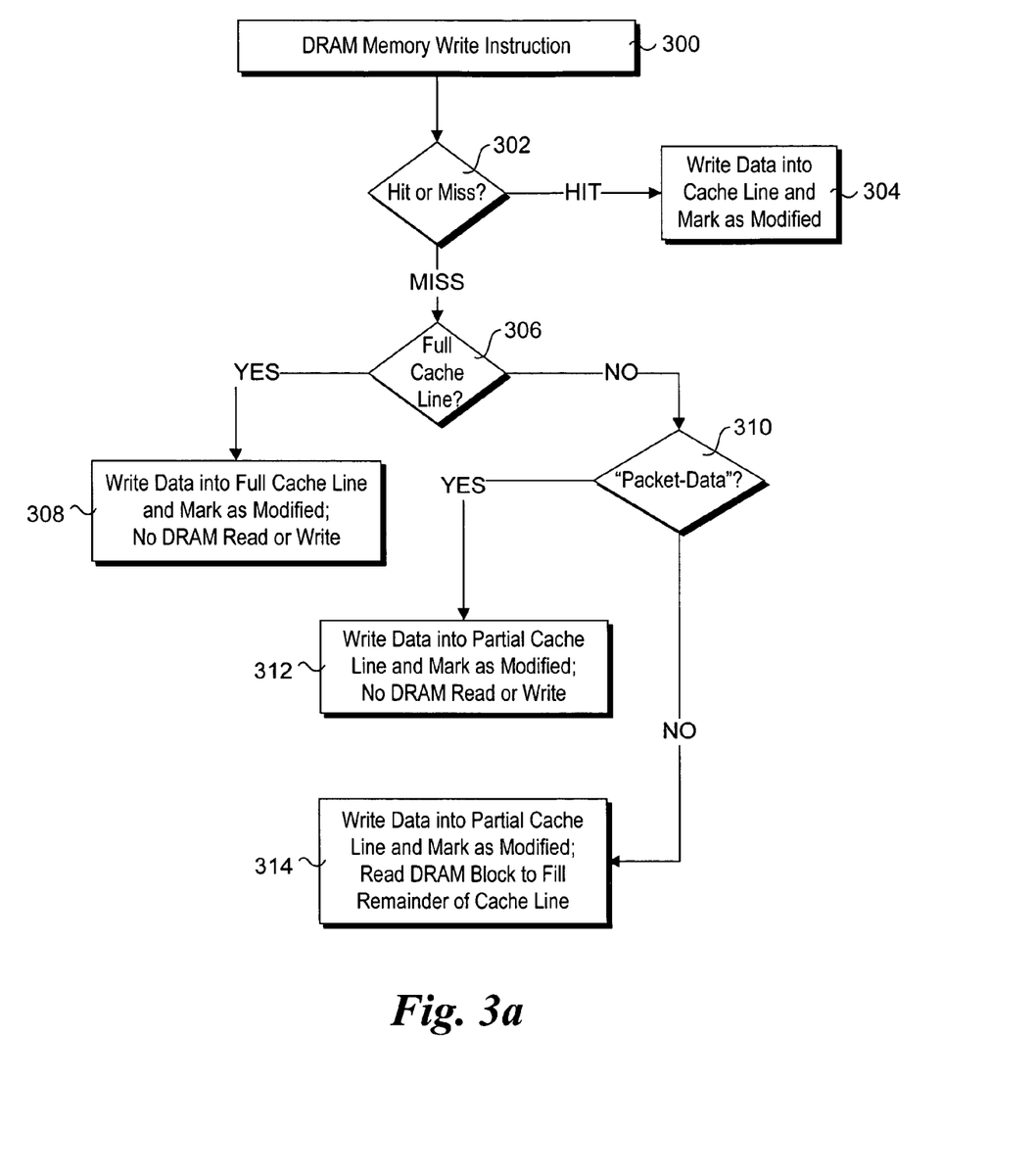
FIG. 3a is a flowchart illustrating operations and logic performed during a memory write, according to one embodiment under which temporal data is written to partial cache lines without a memory read and fill for the remainder of the cache line.

Operations and logic illustrating further details of a DRAM memory write process, under one embodiment, are shown in FIG. 3a. The process begins in a block 300 with a DRAM Write instruction referencing the portion of DRAM 126 (e.g., address of memory block and offset, as applicable) to be accessed. In a decision block 302, a determination to whether the memory write results in a cache hit is made. If a cache line 115 corresponding to the referenced memory block is present in cache 114, a cache hit results. Accordingly, data is written to the cache line and the line is marked as modified in a block 304.

If a cache miss results, the logic proceeds to a decision block 306 to determine whether the storage request will fill a full cache line. For example, upon initial processing of a received packet, when the write operation of block 204 is processed, the corresponding data will have yet to be cached, resulting in a cache miss. With respect to the determination made in decision block 306, cache space is allocated on a cache-line basis, wherein the size of the cache line is fixed and typically (but is not required to) matches the size of the memory blocks 127 in DRAM 126 to support a 1:1 relationship between a cache line and a memory block. At the same time, the size of a packet is variable. In the event the size of a packet is greater than and not an integer multiple of the size of a cache line, the last cache line allocated for the packet data will not be "filled" by the packet data. The same holds true for a packet having a size that is less than the cache line size, such as a minimum size packet.

For each portion of the data that will occupy a full cache line, the logic proceeds to a block 308, in which the data is written to the cache line, and the line is marked as modified. In addition, there is no DRAM Read or Write operation that is performed. As with a conventional write-back cache policy, in connection with flushing a cache line (i.e., making the cache line available for re-allocation), the data in the cache line will be written to the corresponding memory block 128. As a result, there is no need to store (write) the data in DRAM at this point.

For each portion of the packet data that will not fully occupy a cache line, the logic proceeds to a decision block 310, wherein a determination is made to whether the write instruction includes a "packet-data" modifier. For example, in one embodiment a separate memory write instruction is employed for this purpose, such as "WRITEP". Optionally, the bit pattern of a conventional memory Write instruction may be modified to effect the "packet-data" modifier. In general, the write instruction will contain some indicia identifying that the cache policy to be in effect corresponds to a separate policy corresponding to temporal data, such as the packet data used to exemplify the caching techniques herein.

In further detail, the "packet-data" modifier is used to distinguish packet data (e.g., temporal data) from other data that is stored in DRAM. Through the use of this modifier, a hint can be provided to instruct cache controller 112 on how the data is to be cached. In accordance with one embodiment, if the "packet-data" modifier is present, the data is written to a partial cache line in a block 312, and the cache line is marked as modified. As with block 308, there is no DRAM read or write operation. In contrast, if the "packet-data" modifier is not present, a conventional partial cache line write operation is performed in a block 314. Under the conventional approach, the partial portion of the cache line is written using the supplied write data. However, to fill the cache line, a DRAM read on the corresponding memory block 127 is performed to copy the remaining portion of the memory block (corresponding to data occupying addresses that are mapped to the unfilled portion of the cache line) into the cache line. As before, the cache line is also marked as modified.

Figure 4A:
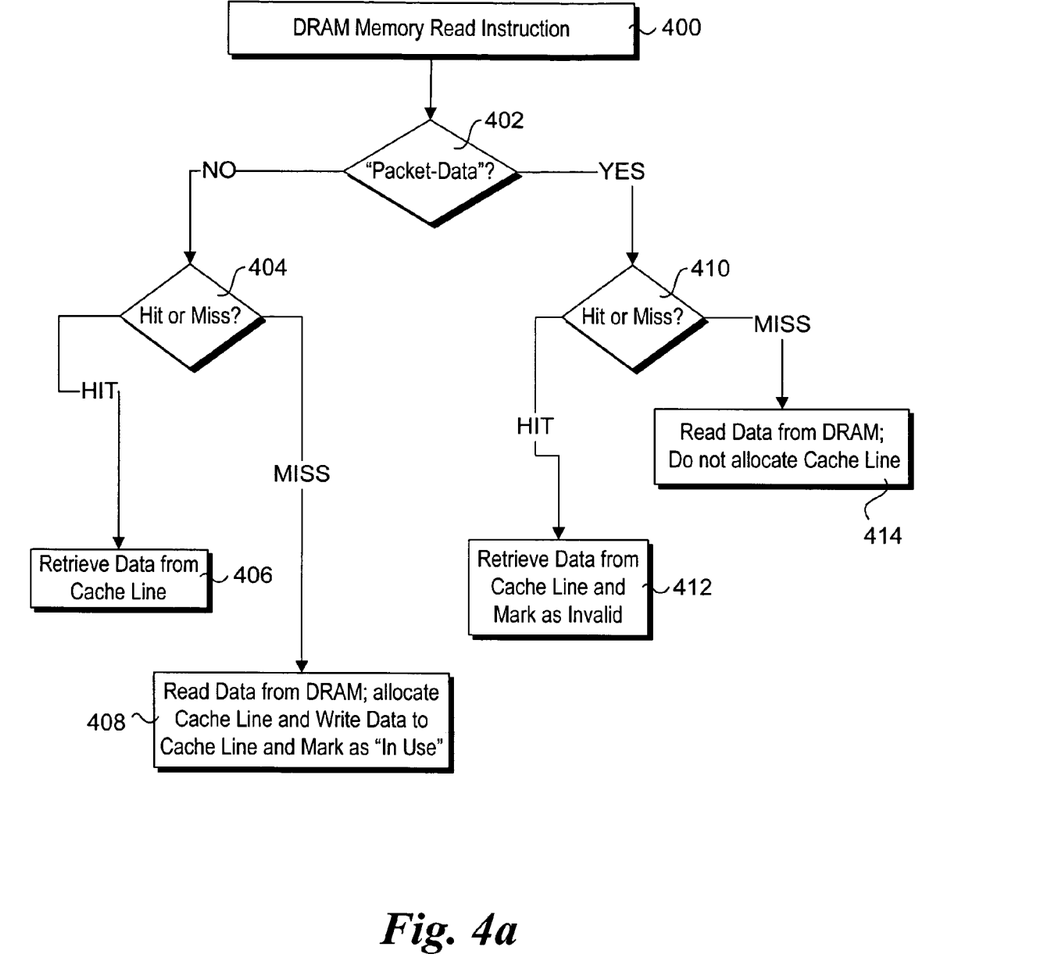
FIG. 4a is a flowchart illustrating operations and logic performed during a memory read, according to one embodiment under which data is read directly from memory without allocating a cache line in the event of a cache miss.

Operations and logic illustrating further details of a DRAM memory read process, under one embodiment, are shown in FIG. 4a. The process begins at a block 400, wherein a DRAM memory Read instruction is received by the processing element (e.g., compute engine 110) for execution, referencing the address of the memory block to be accessed. In response to execution of the Read instruction, a determination is made in a decision block 402 to whether the Read instruction includes a "packet-data" modifier. In a manner analogous to that employed for the Write instruction discussed above, this modifier may be implemented via a specific instruction (e.g., READP), or the bit pattern of an existing Read instruction may be modified to effect a similar result.

In general, a Read instruction with the "packet-data" modifier may be implemented when accessing data for a final time; otherwise, a conventional Read instruction will typically be employed. The reason for this relates to how caches handle hits and misses on reads. In the event that data will no longer be accessed, there is no need to keep the data in the cache (on a hit), or have the data cached (on a miss). Thus, a special instruction is used for such accesses. However, it is noted that the "packet-data" modifier need not (in fact should not) be employed for all access to packet data. For example, when wanting to read a packet header, it is recommended that a conventional Read instruction be employed. The reasons for this will become clear in view of the following cache policies.

In the event that the Read instruction does not contain the "packet-data" modifier, conventional cache operations are performed. First, cache 114 is checked to see if the memory block referenced by the Read instruction is cached, with the result depicted by a Hit or Miss decision block 404. In the event of a hit, the logic proceeds to retrieve the data from the cache line in a block 406. In the event of a Miss, the data is read from DRAM 126, and a cache line 115 is allocated in cache 114, the data is written to the cache line, and the line is marked as "in use." These operations are shown in a block 408.

If the "packet-data" modifier is present, the logic proceeds to a Hit or Miss decision block 410 to determine whether the data is present in the cache. If so, the data is retrieved from the cache, and the cache line is marked as invalid, as depicted in a block 412. The reason for marking the cache line as invalid is that a packet data read with the "packet-data" modifier will typically correspond to the read operation of block 208 of FIG. 2, which is used to copy the packet into a Tx buffer prior to transmission. As a result, there will be no subsequent DRAM access for the packet data, and thus no need to keep the data in either DRAM or the cache. Marking the cache line as invalid further enables the cache line to be re-allocated for subsequent use.

Similar streamlining is employed for a cache miss. As depicted in a block 414, in response to a cache miss the data is read directly from DRAM 126. However, there is no cache line allocated in cache 114, nor is there a copy of the data written to the cache. Again, the reason for this is that since there will be no subsequent use of the data, there is no need to cache it.

Another aspect of some embodiments is the ability to programmatically define "soft" locking of cache lines. Under the "soft-lock" scheme, selected cache lines may be soft locked, meaning those cache lines have a higher priority than other cache lines, and thus are not to be replaced unless the other cache lines are unavailable. In one embodiment, the presence of the "packet-data" modifier for a Read or Write instruction causes a soft lock state bit for the cache line to be set (for Write) or cleared (for Read). This state bit is used to provide a hint to the cache controller that the corresponding cache line should not be chosen for re-allocation. For example, the following exemplary algorithm for choosing a cache line to allocate may be employed using the "soft-lock" state bit:

Priority of choosing a line to replace upon a cache miss:
1. Any invalid line. If no lines meet this then, then:
2. Any line not soft-locked. If no lines meet this then:
3. Any line.

The foregoing priority rules favor choosing used lines over soft-locked lines, using programmer-controlled hints. This is advantageous over conventional caching policies such as least recently used (LRU), since the programmer knowledge that a line will be read again soon is a better heuristic than the fact that it was used recently. However, this does not imply that the techniques described herein must be used in place of such conventional caching policies, but rather aspects of the techniques and conventional caching policies may be combined. For example, the following combines soft-locking with a conventional LRU policy that implements a used bit to mark a cache line in a set as recently used:

1. Any invalid line. If no lines meet this then, then:
2. Any line not soft-locked AND not used bit set. If no lines meet this, then:
3. Any line not soft-locked. If no lines meet this then:
4. Any line.

Figure 3B:
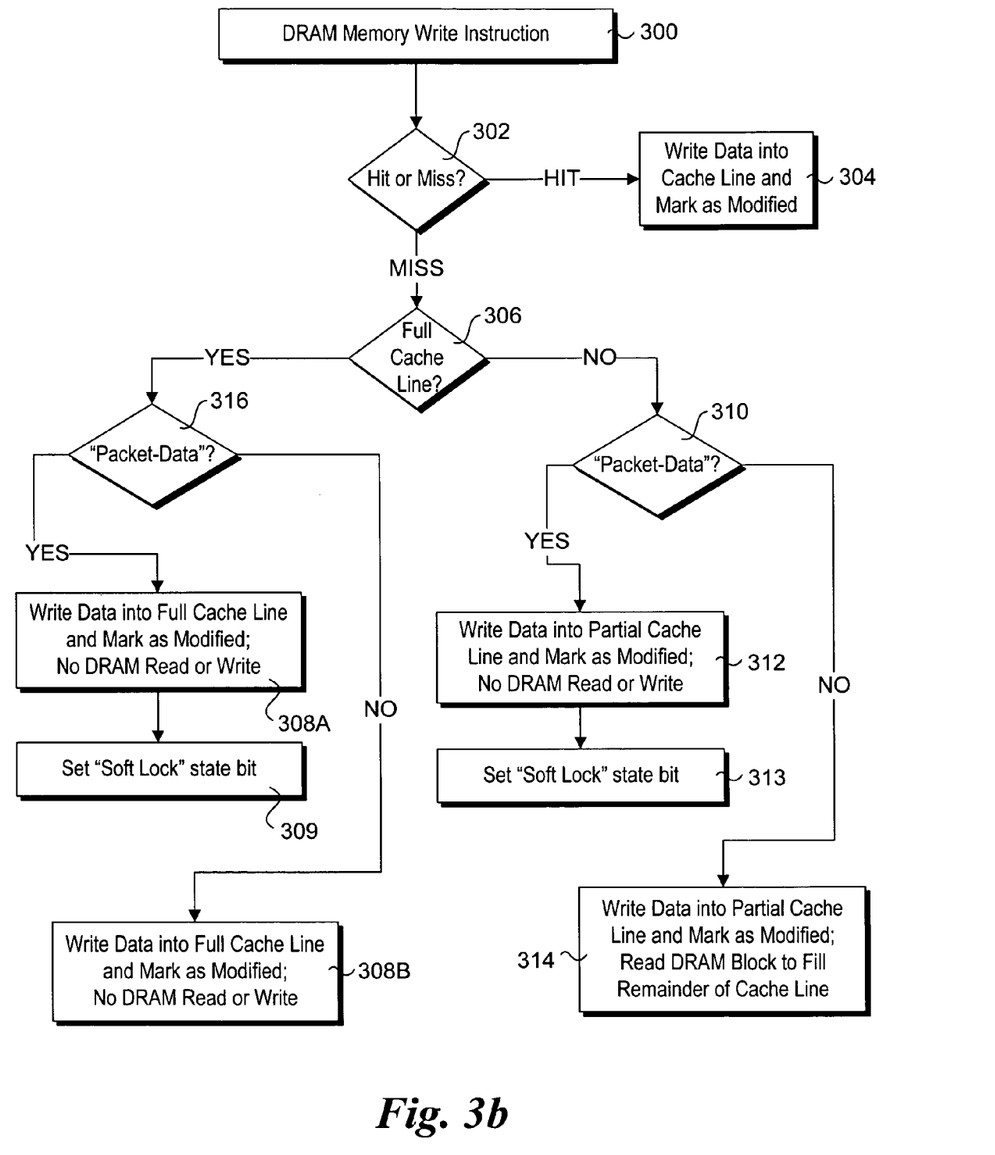
FIG. 3b is a flowchart illustrating an augmentation of the process of FIG. 3a further including the use of a soft-lock state of cache lines.

An example of operations and logic performed during processing of a DRAM memory Write Instruction using the "soft-lock" scheme is shown in FIG. 3b, wherein blocks with like reference numbers to those shown in FIG. 3a and discussed above perform similar operations. Accordingly, the following will focus only on the difference between the two flowcharts.

In response to the full cache line determination of block 306, a determination is made in a decision block 316 to whether the "packet-data" modifier is present. If not, the operations of block 308B are performed in a similar manner to that described above with reference to block 308 in the flowchart of FIG. 3a. However, it the "packet-data" modifier is present, the "soft-lock" bit is set in a block 309 in addition to writing the data into the full cache line and marking the line as modified in a block 308A.

If the cache line will not be filled and the "packet-data" modifier is present, the logic proceeds to block 312 to write the data into the partial cache line and mark the line as modified. In addition, the "soft lock" state bit is set in a block 313.

Figure 4B:
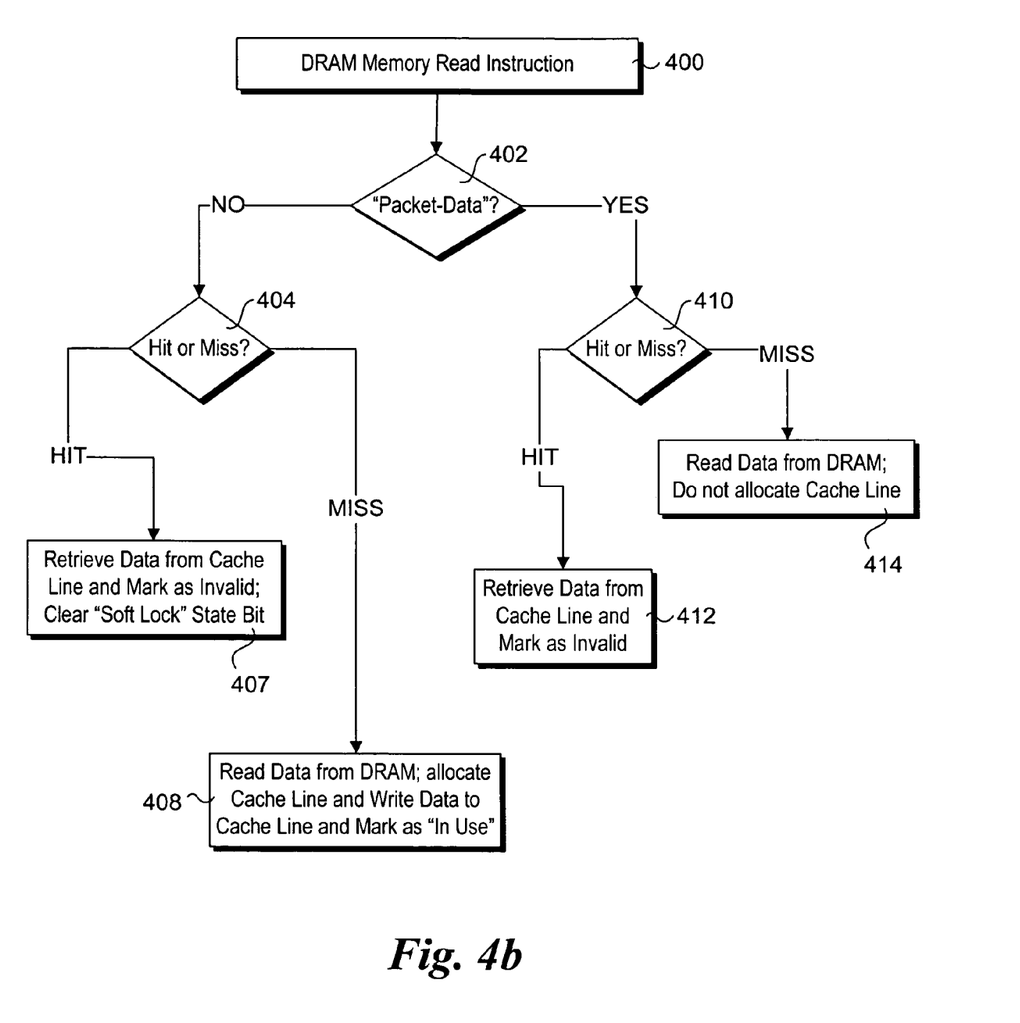
FIG. 4b is a flowchart illustrating an augmentation of the process of FIG. 4a further including the use of a soft-lock state of cache lines.

An example of logic operations performed during processing of a DRAM memory Read Instruction using the "soft-lock" scheme is shown in FIG. 4b, wherein blocks with like reference numbers to those shown in FIG. 4a and discussed above perform similar operations. In this case, the additional operations pertain to a block 407, which is encountered when the "packet-data" modifier is present and a cache hit results. Accordingly, the data is retrieved from the cache, the cache line is marked as invalid, and the "soft lock" state bit is cleared. This makes the cache line available for immediate re-allocation. Since the data will no longer be needed, there is likewise no longer a need to hold the data in a cache line, and thus such cache lines may be released.

In general, several techniques may be employed to effect the "data-packet" modifier and optional associated "soft-lock" cache line mechanisms. Eventually, however, cache policy indicia will be encoded into machine-level code that is suitable to be run on the target processor, since processors do not execute source-level code. As described below in further detail, in one embodiment special op codes are added to a processor's instruction set to instruct the processor to effect read and write operations with the "data-packet" modifier asserted.

Figure 5:
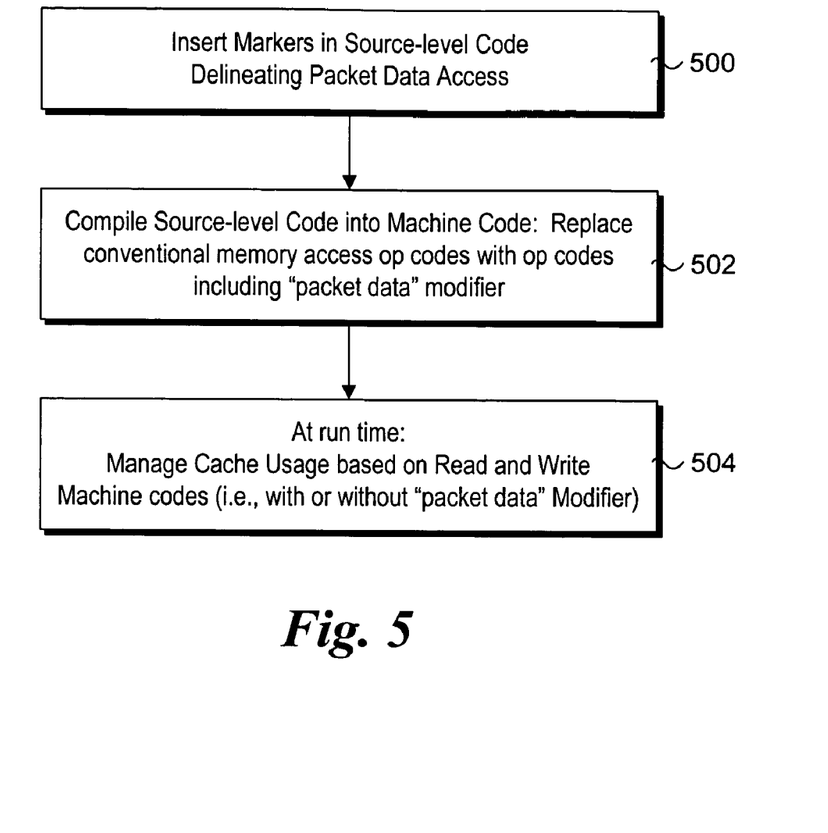
FIG. 5 is a flowchart illustrating operations performed by a programmer to generate instructions containing hints for effecting a temporal data caching policy.
Figure 6:
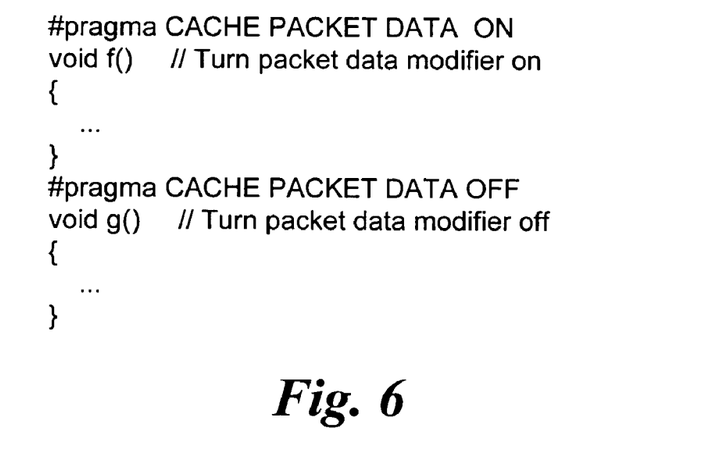
FIG. 6 is a pseudocode listing illustrating the use of exemplary pragma statements to cause a compiler to substitute modified instructions containing hints for effecting the temporal data caching policy.

In one embodiment, markers are embedded at the source code level, resulting in the generation of corresponding cache policy cues in the machine code. With reference to FIG. 5, this process begins at a block 500 in which markers are inserted into high-level source code to delineate cache policies for the different code portions. In one embodiment, the high-level code comprises programming code written in the C or C++ language, and the markers are implemented via corresponding pragma statements. Pseudocode illustrating a set of exemplary pragma statements to effect a packet-data on/off caching policy is shown in FIG. 6. In this embodiment, there are two caching policies: ON, indicating the "data-packet" modifier policy is in effect, and OFF, the default policy, indicating the "data-packet" modifier policy is not in effect. The pragma statement "CACHE PACKET DATA ON" is used to mark the beginning of a code portion in which Read and Write instructions are to have the "data-packet" modifier asserted, while the "CACHE PACKET DATA OFF" pragma statement is used to mark the end of the code portion.

In another embodiment, special instructions are added to a conventional high-level language and associated complier to enable the programmer to explicitly effect the "data-packet" modifier the corresponding high-level code. For example, instructions such as Read Packet Data, Write Packet Data, etc. could be included in the source level code.

The pragma statements shown in FIG. 6 or the explicit source-level instructions instruct the compiler to generate machine code that includes embedded cues instructing the processor and/or cache controller how the cache usage and eviction policies are to be implemented. In one embodiment, this is accomplished by replacing conventional memory access op codes with new op codes that provide a means for informing the processor and/or cache controller whether the "packet-data" modified and/or "soft-lock" mechanism is in effect, as shown in a block 502.

In one embodiment, an explicit op code is provided for each memory access instruction. For example, under one common instruction set, the READ instruction is used to move data between memory and registers. For effecting the "packet-data" modifier, a READP (read packet) assembly-level instruction might be added to the mnemonic instruction set. Similar, a WRITEP (write packet) assembly-level instruction could be added. This approach further would enable a programmer to write code at the assembly level and/or optimize portions of assembly-level code derived from compiled source-level code.

In another embodiment, instructions are used to explicitly set and clear a soft lock flag. Under this approach, a corresponding flag register is checked in conjunction with decoding selected memory access instructions, with the flag identifying whether the corresponding cache line was soft locked.

As shown in a block 504, at run time the cache usage is managed via directional cues (the specific op codes and optional operands) contained in the executed machine code. Techniques showing hardware implementations for effectuating the cache eviction policies are discussed below.

In general, different types of overall cache schemes (with various techniques for implementing each scheme) may be employed to the caching techniques described herein. These include the fully-associative cache, and the n-way set-associative cache. (Under certain implementations, direct-mapped caches may also be used—however the hit ratio for direct-mapped caches is relatively poor compared to the other designs because of its inflexibility). Under fully-associative caches, any memory location can be cached in any cache line. This is the most complex technique and requires sophisticated search algorithms when checking for a hit. It can lead to the whole cache being slowed down because of this, but it offers the best theoretical hit ratio, since there are so many options for caching any memory address. n-way set-associative caches combine aspects of direct-mapped and fully-associative caches. Under this approach, the cache is broken into sets of n lines each (e.g., n=2, 4, 8, etc.), and any memory address can be cached in any of those n lines within the selected set. Effectively, the sets of cache line are logically partitioned into n groups. This improves hit ratios over the direct mapped cache, but without incurring a severe search penalty (since n is kept small).

Figure 7:
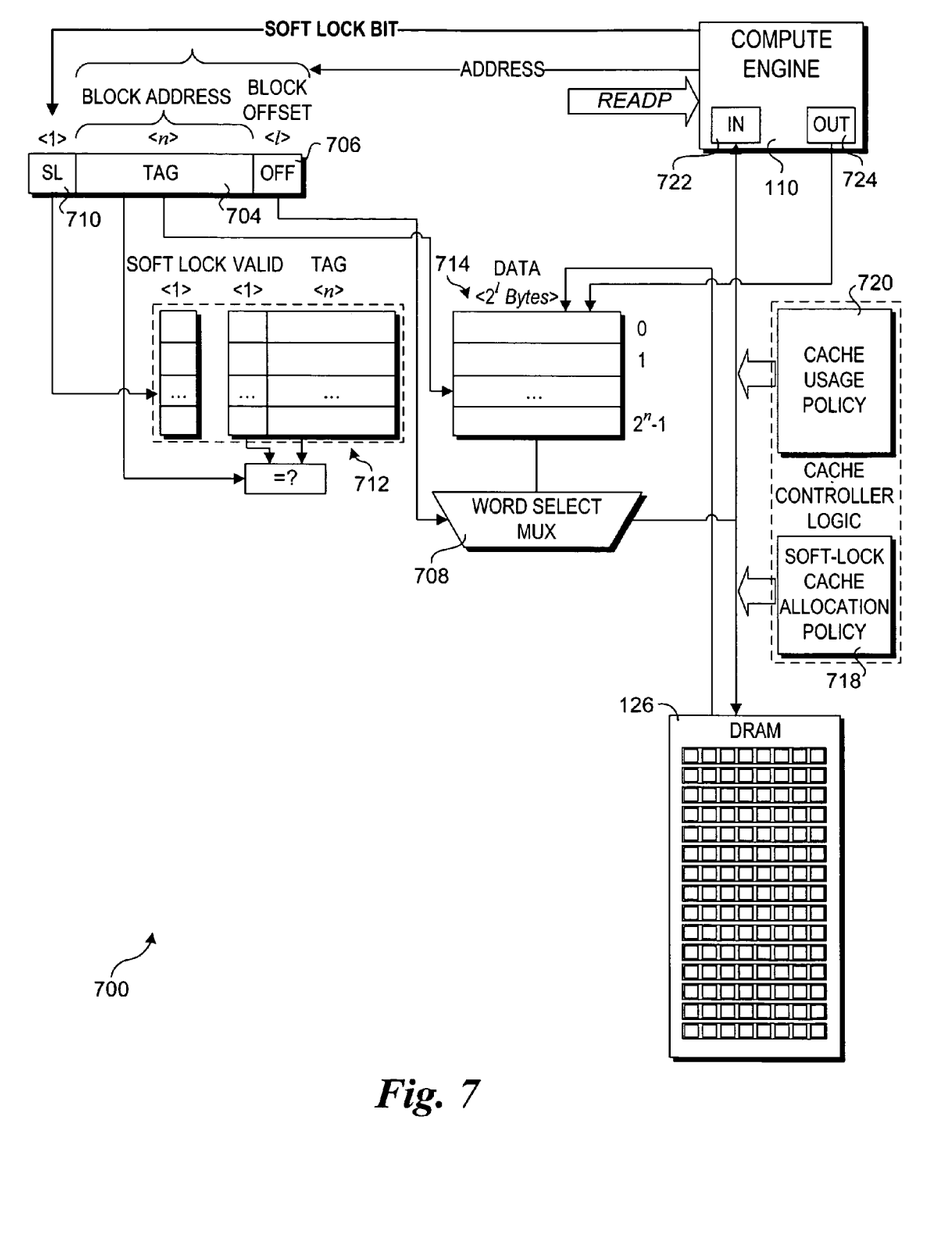
FIG. 7 is a schematic diagram illustrating one embodiment of a cache architecture to effect one embodiment of a temporal data caching policy.

An exemplary cache architecture 700 implementing a fully-associative cache scheme to support programmatic control of cache usage and eviction policies is shown in FIG. 7. In general, the principles disclosed in this embodiment may be implemented on various types of well-known cache architectures, including n-way set-associative cache architectures and fully-associative cache architectures. It is further noted that details of other cache components, such a multiplexers, decode logic, data ports, etc. are not shown for clarity in FIG. 7. It will be understood by those skilled in the art that these components would be present in an actual implementation of the architecture. The main components of the architecture include a processor 702, various cache control elements (specific details of which are described below) collectively referred to as a cache controller, and the actual cache storage space itself, which is comprised of memory used to store tag arrays and cache lines, also commonly referred to as blocks.

The general operation of cache architecture 700 is similar to that employed by a conventional fully-associative cache, with the exception of extensions for the "packet-data" modifier and soft lock mechanism. In response to a memory access request (made via execution of a corresponding instruction or instruction sequence), an address referenced by the request is forwarded to the cache controller. The fields of the address are partitioned into a TAG 704, and a block OFFSET 706. The TAG 704 is commonly referred to as the block (or cache line) address. Block OFFSET 706 is also commonly referred to as the byte select or word select field. The purpose of a byte/word select or block offset is to select a requested word (typically) or byte from among multiple words or bytes in a cache line. For example, typical cache lines sizes range from 8-128 bytes. Since a cache line is the smallest unit that may be accessed in a cache, it is necessary to provide information to enable further parsing of the cache line to return the requested data. The location of the desired word or byte is offset from the base of the cache line, hence the name block "offset." Selection of the word is effected by a word select multiplexer (mux) 708.

Typically, $l$ least significant bits are used for the block offset, with the width of a cache line or block being $2^l$ bytes wide. The next set of n (most significant) bits comprise TAG 704. These n bits are used to lookup a corresponding TAG in each TAG array. In addition, each cache line includes a "valid" bit.

In addition to these elements, cache architecture 700 employs a soft lock bit 710. The soft lock bit is used to set or clear a soft lock for an associated cache line. In one embodiment, the soft lock bit is stored in one 1-bit register, while the address is stored in another w-bit register, wherein w is the width of the address. In another embodiment, the combination of the soft-lock bit and address are stored in a register that is w+1 wide. Under cache architecture 700, the cache lines are separated into a TAG array 712 and a cache line array 714.

In response to a memory access request, operation of cache architecture 700 proceeds as follows. In the illustrated embodiment, processor 702 receives a READP instruction 716 referencing a memory address. As discussed above, in one embodiment a READP instruction instructs the processor/cache controller to effect actions associated with a read instruction having the "data-packet" modifier activated (set).

In response to a cache miss, the cache controller allocates a new cache line by selecting an existing cache line to be replaced. In the illustrated embodiment, soft-lock cache line locking policy discussed above is implemented using soft-lock cache allocation policy logic 718.

Another operation performed in conjunction with cache line allocation is the retrieval of the requested data from DRAM 126. The logic for implementing the corresponding memory read or write policy is implemented via cache usage policy logic 720. For example, for implementation that do not employ soft locking of cache lines, cache usage policy 720 employs the logic illustrated in the flowcharts of FIGS. 3a and 4a, while it implements the logic illustrated in the flowcharts of FIGS. 3b and 4b for implementations employing soft locking.

Upon return of the requested data to the cache controller, the data are copied into the allocated cache line, and the corresponding TAG and valid bit is updated in TAG array 712. Rather than return just the requested data, a number of sequential bytes of data proximate to and including the requested data is returned, wherein the number of bytes is equal to the cache line width. For example, for a cache line width of 32 Bytes, 32 Bytes of data would be returned. A word (corresponding to the original request) contained in the new cache line is then read from the cache into an input register 726 for processor 702, with the assist of word select mux 708.

Writing a value corresponding to an un-cached address and updating a value stored in a cache line for cache architecture 700 is also performed in a manner similar to the conventional approach, except for the further use of the "packet-data" modifier and soft lock bit. For non-packet data, this involves a cache write-back, under which data stored in an output register 724 is to be written to system memory (eventually).

The appropriate cache line (should such presently exist) is first searched by the applicable cache lookup algorithm. If found, the cache line is updated with the data in output register 724, and a corresponding modified bit (not shown) is flagged. The system memory may be subsequently updated (if required, in view of the applicable caching policy) with the new value via well-known write-back operations. If the data to be updated is not found in the cache, under one embodiment a cache line is allocated in a manner similar to that described above for a read request, and data is written to that cache line, and the corresponding TAG and valid bit values are updated in an appropriate TAG array.

In addition to the cache architecture illustrated in FIG. 7, other types of cache architectures may be implemented in a similar manner. For example, a set-associative cache architecture may be implemented. In general, the primary components of the set-associative and fully-associative architectures are similar, except the tag array elements and associated cache lines are grouped in sets, and each TAG entry further includes an INDEX field that is used to index into an applicable set. Additionally, appropriate logic is provided to implement the indexing scheme and other elements of set-associative cache operations; such logic and architecture elements are well-known in the art.

FIG. 8 shows further details of one embodiment of NPU 102 and ingress line card 104. In this embodiment, ingress line card 104 comprises an ATCA board that is configured to be coupled to a common backplane in an ATCA chassis that may further include other ATCA modular boards. Accordingly the line card includes a set of connectors to meet with mating connectors on the backplane, as illustrated by a backplane interface 800 (shown off of ingress line card 102 for clarity). In general, backplane interface 800 supports various input/output (I/O) communication channels, as well as provides power to line card 104. For simplicity, only selected I/O interfaces are shown in FIG. 8, although it will be understood that other I/O and power input interfaces also exist. In one embodiment, the I/O interfaces support use in an Advanced Switching (AS) environment, as defined by the ASI (Advanced Switching Interconnect) SIG Advance Switching V1 specification.

NPU 102 includes n microengines 110. In one embodiment, n=8, while in other embodiment n=16, 24, or 32. Other numbers of microengines 1001 may also me used. In one embodiment, 16 microengines 110 are grouped into two clusters of 8 microengines, including an ME cluster 0 and an ME cluster 1 (the latter not shown for clarity).

In the illustrated embodiment, each microengine 110 executes instructions (e.g., microcode) that are stored in a local control store 802. Included among the instructions for one or more microengines are packet processing and queue management instructions that are employed to facilitate the various packet processing and queue management operations described herein. In one embodiment, these instructions are written in the form of microcode macros.

Each of microengines 110 is connected to other network processor components via sets of bus and control lines referred to as the processor "chassis". For clarity, these bus sets and control lines are depicted as an internal interconnect 804. Also connected to the internal interconnect are SRAM interface unit 106, a DRAM controller 806, a general purpose processor 808, a media switch fabric interface 810, a PCI (peripheral component interconnect) controller 812, and a hash unit 814. Other components not shown that may be provided by NPU 102 include, but are not limited to, encryption units, a CAP (Control Status Register Access Proxy) unit, scratch memory, and a performance monitor.

As depicted, DRAM controller 806 collectively provides the functionality of cache controller 112, cache 114, and DRAM interface unit 116. In one embodiment, DRAM 126 employs DDR (double data rate) DRAM. In other embodiments DRAM 126 may employ Rambus DRAM (RDRAM) or reduced-latency DRAM (RLDRAM). Other types of DRAM may also be supported.

General-purpose processor 808 may be employed for various network processor operations. In one embodiment, control plane operations are facilitated by software executing on general-purpose processor 808, while data plane operations are primarily facilitated by instruction threads executing on microengines 110.

Media switch fabric interface 810 is used to interface with the media devices or switch fabric for the network device in which the line card is installed. In one embodiment, media switch fabric interface 810 employs a System Packet Level Interface 4 Phase 2 (SPI4-2) interface 816. Optionally, media switch fabric interface 816 may support a CSIX, NPSI and/or ASI interface. In general, the actual switch fabric may be hosted by one or more separate line cards, or may be built into the chassis backplane (e.g., as a passive switch fabric). Both of these configurations are represented by switch fabric 818. In one embodiment (not illustrated), the media switch fabric interface includes Rx buffers 120 and Tx buffers 122 and provides logic to implement the receive and transmit buffer management operations described herein.

PCI controller 812 enables the network processor to interface with one or more PCI devices that are coupled to backplane interface 800 via a PCI interface 820. In one embodiment, PCI interface 820 comprises a PCI Express interface.

During initialization, coded instructions (e.g., microcode) to facilitate various packet-processing and other operations are loaded into control stores 802. In one embodiment, the instructions are loaded from a non-volatile store 822 hosted by ingress line card 104, such as a flash memory device. Other examples of non-volatile stores include read-only memories (ROMs), programmable ROMs (PROMs), and electronically erasable PROMs (EEPROMs). In one embodiment, non-volatile store 822 is accessed by general-purpose processor 808 via an interface 824. In another embodiment, non-volatile store 822 may be accessed via an interface (not shown) coupled to internal interconnect 804.

In addition to loading the instructions from a local (to line card 104) store, instructions may be loaded from an external source. For example, in one embodiment, the instructions are stored on a disk drive 826 hosted by another line card (not shown) or otherwise provided by the network device in which line card 104 is installed. In yet another embodiment, the instructions are downloaded from a remote server or the like via a network 828 as a carrier wave.

In general, each of the functional blocks illustrated in the figures and discussed herein may be implemented using programmable logic in hardware, programmable logic in firmware/software via execution of corresponding threads on one or more compute engines, or a combination of the two. For example, various packet-processing operations, including classification and queue management operations, may be implemented via execution of corresponding instruction threads on one or more compute engines 110. Optionally, all or a portion of the various operations provided by the functional blocks discussed herein may be implemented by appropriately-programmed logic embedded on an NPU or the like.

Thus, embodiments of this invention may be used as or to support firmware/software modules and/or programs executed upon some form of processing core or otherwise implemented or realized upon or within a machine-readable medium. A machine-readable medium includes any mechanism for storing or transmitting information in a form readable by a machine (e.g., a computer). For example, a machine-readable medium can include such as a read only memory (ROM); a random access memory (RAM); a magnetic disk storage media; an optical storage media; and a flash memory device, etc. In addition, a machine-readable medium can include propagated signals such as electrical, optical, acoustical or other form of propagated signals (e.g., carrier waves, infrared signals, digital signals, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A method, comprising
receiving a memory access instruction;
determining whether the instruction contains indicia identifying a caching policy for temporal data is to be employed; and if so,
employing the caching policy for temporal data; otherwise, employing a default caching policy,
wherein the caching policy for temporal data includes:
implementing a cache line allocation scheme including a soft lock mechanism that effects a preference for keeping cache lines having soft locks; and
employing the soft lock mechanism for memory access instructions containing indicia indicating the memory access pertains to temporal data.

2. The method of claim 1, wherein the temporal data comprises network packet data, and the indicia comprises a packet data modifier.

3. The method of claim 2, wherein the instruction comprises a memory write instruction containing a packet data modifier identifying the memory write is to store temporal packet data in a buffer, the method further comprising,
determining there is a cache miss corresponding to the memory write;
allocating at least one cache line to provide sufficient storage space for storing the packet data;
determining whether all or a portion of the packet data will fill a given cache line that is allocated; and if so,
writing said all or a portion of the packet data to the cache line; otherwise
writing said all or a portion of the packet data to a partial portion of the cache line without modifying existing data in a remainder of the cache line.

4. The method of claim 3, further comprising:
receiving a second memory write instruction that does not contain a packet data modifier, the second memory write instruction referencing data to be written into memory;
determining there is a cache miss corresponding to the second memory write;
allocating one or more cache lines providing sufficient storage space for storing the data;
determining whether all or a portion of the packet data will fill a given cache line; and if so,
writing said all or a portion of the data to the cache line; otherwise
writing said all or a portion of the data to a partial portion of the cache line;
reading data from a portion of a memory block corresponding to a remaining portion of cache line and writing the read data to the remaining portion of the cache line.

5. The method of claim 2, wherein the instruction comprises a memory read instruction containing a packet data modifier identifying the memory read is to read temporal packet data from a memory buffer, the method further comprising,
determining whether the packet data is present in a cache; and if not,
reading the packet data from a memory buffer without allocating a cache line in the cache to cache the packet data.

6. The method of claim 2, wherein the instruction comprises a memory read instruction containing a packet data modifier identifying the memory read is to read temporal packet data from a memory buffer, the method further comprising,
determining whether the packet data is present in a cache; and if so,
reading the packet data from one or more cache lines in which the data are cached; and
marking the one or more cache lines as invalid.

7. The method of claim 2, further comprising:
receiving a packet;
allocating a memory buffer;
allocating one or more cache lines corresponding to the memory buffer,
writing packet data into the one or more cache lines;
performing packet processing operations employing the packet data;
reading packet data from the one or more cache lines;
transmitting the packet data to a target destination; and
de-allocating DRAM buffers and the one or more cache lines,
wherein at least a portion of memory accesses employ memory read and memory write instructions including a packet data modifier identifying the memory access corresponds to temporal packet data.

8. The method of claim 7, wherein the packet is received by an ingress line card including at least one network processor and hosting DRAM (Dynamic Random Access Memory) external to the network processor, and the memory buffer comprising a DRAM buffer.

9. The method of claim 8, wherein transmitting the packet data to a target destination comprising transmitting the target data into a switch fabric to be received by another line card.

10. The method of claim 1, further comprising effecting a cache line allocation policy having logic comprising:
(1) allocating any cache line that is invalid; if no cache lines meet this then,
(2) allocating any cache line that is not soft-locked; and if no cache lines meet this then,
(3) allocating any cache line.

11. The method of claim 1, further comprising: implementing the soft lock mechanism using a soft lock state bit that is associated with a respective cache line.

12. A processor, comprising:
a processor core;
a memory interface unit, coupled to the processor core;

a cache controller, coupled to the processor core; and
a cache, controlled by the cache controller and operatively coupled to receive data from and to provide data to the processor core,
wherein the cache controller is configured to effect a cache policy including a default caching policy and a temporal data caching policy, and wherein the temporal data caching policy is implemented in response to processing memory access instructions including indicia identifying the temporal data caching policy is to be employed,
wherein a first memory access instruction includes a memory read instruction including the indicia identifying the memory read instruction is to read packet data from a memory buffer,
wherein in response to a cache miss corresponding to the memory read, the temporal data caching policy includes reading the packet data from a memory buffer without allocating a cache line in the cache to cache the packet data.

13. The processor of claim 12, wherein a second memory access instruction comprises a memory write instruction containing a packet data modifier identifying the memory write is to store temporal packet data in a memory buffer, and wherein in response to a cache miss corresponding to the memory write the temporal data caching policy comprising,
allocating one or more cache lines providing sufficient storage space for storing the packet data;
determining whether all or a portion of the packet data will fill a given cache line; and if so,
writing said all or a portion of the packet data to the cache line; otherwise
writing said all or a portion of the packet data to a partial portion of the cache line without modifying existing data in a remainder of the cache line.

14. The processor of claim 12, wherein in response to a cache hit corresponding to the memory read instruction the temporal data caching policy comprising:
reading the packet data from one or more cache lines in which the data are cached; and
marking the one or more cache lines as invalid.

15. The processor of claim 12, wherein the cache controller further includes cache line allocation logic to effect a soft-lock mechanism comprising,
prioritizing cache line replacement such that cache lines having soft locks are allocated a higher priority for keeping over other cache lines not having soft locks; and
employing the soft lock mechanism for memory access instructions containing indicia indicating the memory access pertains to temporal data.

16. The processor of claim 15, wherein the cache line allocation logic comprises:
(1) allocating any cache line that is marked invalid; if no cache lines meet this then,
(2) allocating any cache line that is not soft-locked and not marked as in use; if no cache lines meet this then:
(3) allocating any cache line that is not soft-locked; and if no cache lines meet this then,
(4) allocating any cache line.

17. A network line card, comprising:
a printed circuit board (PCB) having a backplane interface including signal lines corresponding to a media switch fabric interface;
an SRAM-(Static Random Access Memory) based store, mounted on the PCB;
a DRAM-based memory store, mounted on the PCB; and
a network processor unit (NPU), coupled to the PCB, comprising, a processor core;
a DRAM interface unit, coupled between the processor core and the DRAM-based store;
an SRAM interface unit, coupled between the processor core and the SRAM-based store;
a cache controller, coupled to the processor core and the DRAM interface unit; and
a cache, controlled by the cache controller and operatively coupled to receive data from and to provide data to the processor core,
wherein the cache controller is configured to effect a cache policy including a default caching policy and a temporal packet data caching policy, and wherein the temporal packet data caching policy is implemented in response to processing memory access instructions including a packet data modifier identifying the temporal packet data caching policy is to be employed.

18. The network line card of claim 17, wherein one memory access instruction comprises a memory write instruction containing a packet data modifier identifying the memory write is to store temporal packet data in a memory buffer, and wherein in response to a cache miss corresponding to the memory write the temporal data caching policy comprising,
allocating one or more cache lines providing sufficient storage space for storing the packet data;
determining whether all or a portion of the packet data will fill a given cache line; and if so,
writing said all or a portion of the packet data to the cache line; otherwise
writing said all or a portion of the packet data to a partial portion of the cache line without modifying existing data in a remainder of the cache line.

19. The network line card of claim 18, wherein one memory access instruction comprises a memory read instruction containing a packet data modifier identifying the memory read is to read temporal packet data from a memory buffer in the DRAM-based store, wherein in response to a cache miss corresponding to the memory read the temporal data caching policy comprising,
reading the packet data from a memory buffer without allocating a cache line in the cache to cache the packet data.

20. The network line card of claim 18, further comprising a non-volatile store operatively coupled to the PCB and including instructions to execute on the processor core to perform operations comprising:
performing initial processing of a packet received at an input/output port of the backplane interface, the initial processing including,
allocating a memory buffer in the DRAM-based store;
allocating one or more cache lines corresponding to the memory buffer;
writing packet data into the one or more cache lines;
writing packet metadata into the SRAM-based store;
performing packet classification operations employing at least one of the packet metadata and packet data to assign the packet to a flow;
reading packet data from the one or more cache lines;
transmitting the packet data into a switch fabric via the media switch fabric interface to a target destination corresponding to the flow; and
de-allocating the DRAM buffers and the one or more cache lines,
wherein at least a portion of memory accesses employ memory read and memory write instructions including a packet data modifier identifying the memory access corresponds to temporal packet data, and corresponding cache policies are implemented for such memory access instructions.

21. A method, comprising
receiving a memory write instruction;
determining whether the memory write instruction contains indicia identifying a caching policy for network packet data is to be employed; and if so,
employing the caching policy for the network packet data; otherwise,
employing a default caching policy,
wherein employing the caching policy for the network packet data includes:
  determining there is a cache miss corresponding to the memory write;
  allocating at least one cache line to provide sufficient storage space for storing the packet data;
  determining whether all or a portion of the packet data will fill a given cache line that is allocated; and if so,
  writing said all or a portion of the packet data to the cache line; otherwise
  writing said all or a portion of the packet data to a partial portion of the cache line without modifying existing data in a remainder of the cache line.

22. A method, comprising:
receiving a memory read instruction;
determining whether the memory read instruction contains indicia identifying a caching policy for network packet data is to be employed; and if so,
employing the caching policy for the network packet data; otherwise,
employing a default caching policy,
wherein employing the caching policy for the network packet data includes:
  determining whether the packet data is present in a cache; and if not,
  reading the packet data from a memory buffer without allocating a cache line in the cache to cache the packet data.

* * * * *